Figure 1:
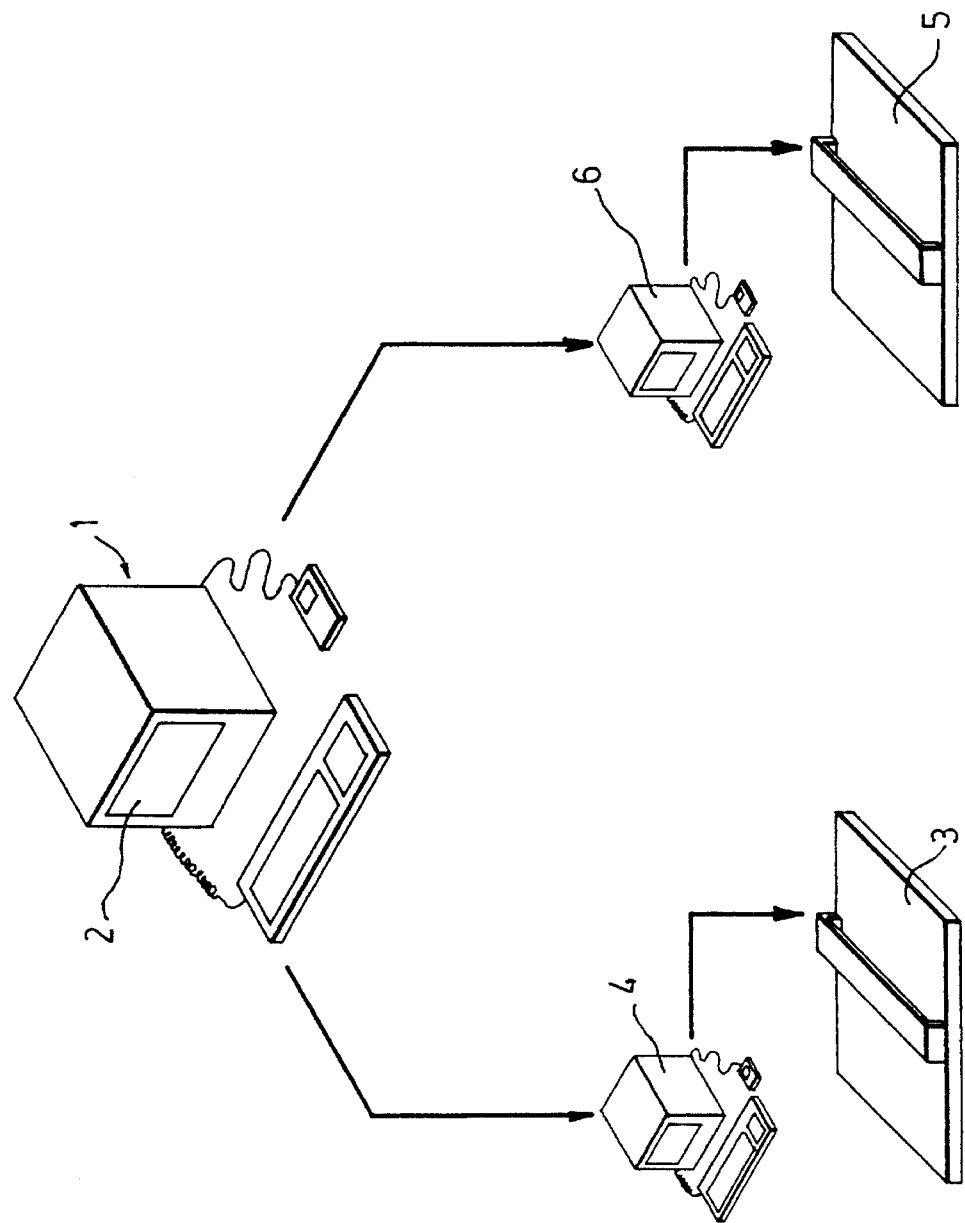

United States Patent [19]

Servanty et al.

[11] Patent Number: 5,556,491
[45] Date of Patent: Sep. 17, 1996

[54] METHOD AND DEVICE FOR MANUFACTURING ADHESIVE ELEMENTS TO BE APPLIED TO A THREE-DIMENSIONAL SURFACE FOR THE PURPOSE OF DECORATING IT

[75] Inventors: Guy Servanty, Leguevin; Philippe Obry, Beauzelle, both of France

[73] Assignees: C.A.S.O. Conception Aéronautique du Sud-Ouest, Blagnac; Aerospatiale, Paris, both of France

[21] Appl. No.: 87,333

[22] Filed: Jul. 8, 1993

[30] Foreign Application Priority Data

Jul. 10, 1992 [FR] France ................... 92 08890

[51] Int. Cl.⁶ ............................. B32B 31/00
[52] U.S. Cl. ............... 156/64; 244/129.1; 364/474.03; 364/474.24
[58] Field of Search ............... 156/64, 353; 364/474.03, 364/474.24; 395/119, 125; 244/1 R, 129.1; 116/28 R; 40/615, 616, 212; 118/669, 696, 697

[56] References Cited

U.S. PATENT DOCUMENTS

| | | | |
|---|---|---|---|
| 3,548,173 | 12/1970 | Pascoe et al. | 364/474.24 |
| 4,001,069 | 1/1977 | DiMatteo | 156/353 |
| 4,575,330 | 3/1986 | Hull | 364/474.24 |
| 4,591,402 | 5/1986 | Evans et al. | 156/353 |
| 4,778,545 | 10/1988 | Von Derau et al. | 156/353 |
| 4,864,520 | 9/1989 | Setoguchi et al. | 395/119 |
| 4,945,488 | 7/1990 | Carver et al. | 364/474.24 |
| 5,023,800 | 6/1991 | Carver et al. | 364/474.24 |
| 5,031,120 | 7/1991 | Pomerantz et al. | 364/474.24 |
| 5,038,291 | 8/1991 | Wang et al. | 364/474.24 |
| 5,175,018 | 12/1992 | Lee et al. | 118/669 |
| 5,248,341 | 9/1993 | Berry et al. | 118/696 |
| 5,295,075 | 3/1994 | Korner et al. | 364/474.24 |
| 5,311,784 | 5/1994 | Girard et al. | 364/474.24 |

FOREIGN PATENT DOCUMENTS

| | | |
|---|---|---|
| 0307256 | 3/1989 | European Pat. Off. . |
| 0418052 | 3/1991 | European Pat. Off. . |

OTHER PUBLICATIONS

Publication: Beechcraft Model UC–12B, Beech Aircraft Corporation, Aeroryace Programs, Witchita Kansas, Published Mar. 1982.

Primary Examiner—Joseph W. Drodge
Attorney, Agent, or Firm—William R. Hinds

[57] ABSTRACT

A method for manufacturing adhesive elements intended to be applied to a three-dimensional surface for the purpose of decorating it involves, starting from a three-dimensional model representing the surface to be decorated and physical references thereof, and a two-dimensional model constituting a projected "image" of the decoration, referencing the two-dimensional model in relation to the references of the three-dimensional model, carrying out projection computations so as to obtain a three-dimensional representation of the decoration referenced on the three-dimensional surface, and carrying out laying-out computations for this three-dimensional representation. Adhesive elements are then obtained by a cutting process driven from the computation data, and the references are marked on at least some of these elements by tracing driven from the data.

6 Claims, 10 Drawing Sheets

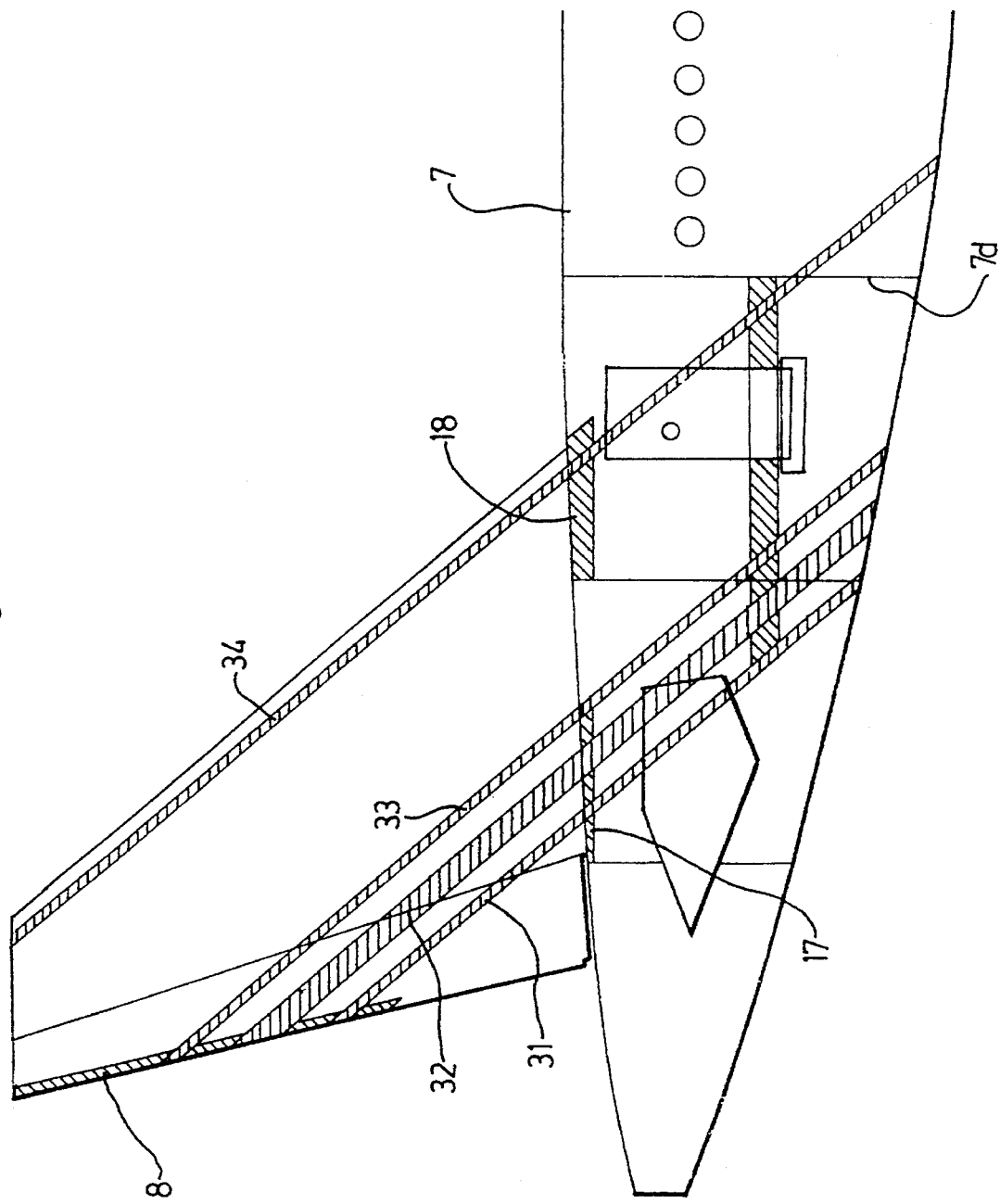

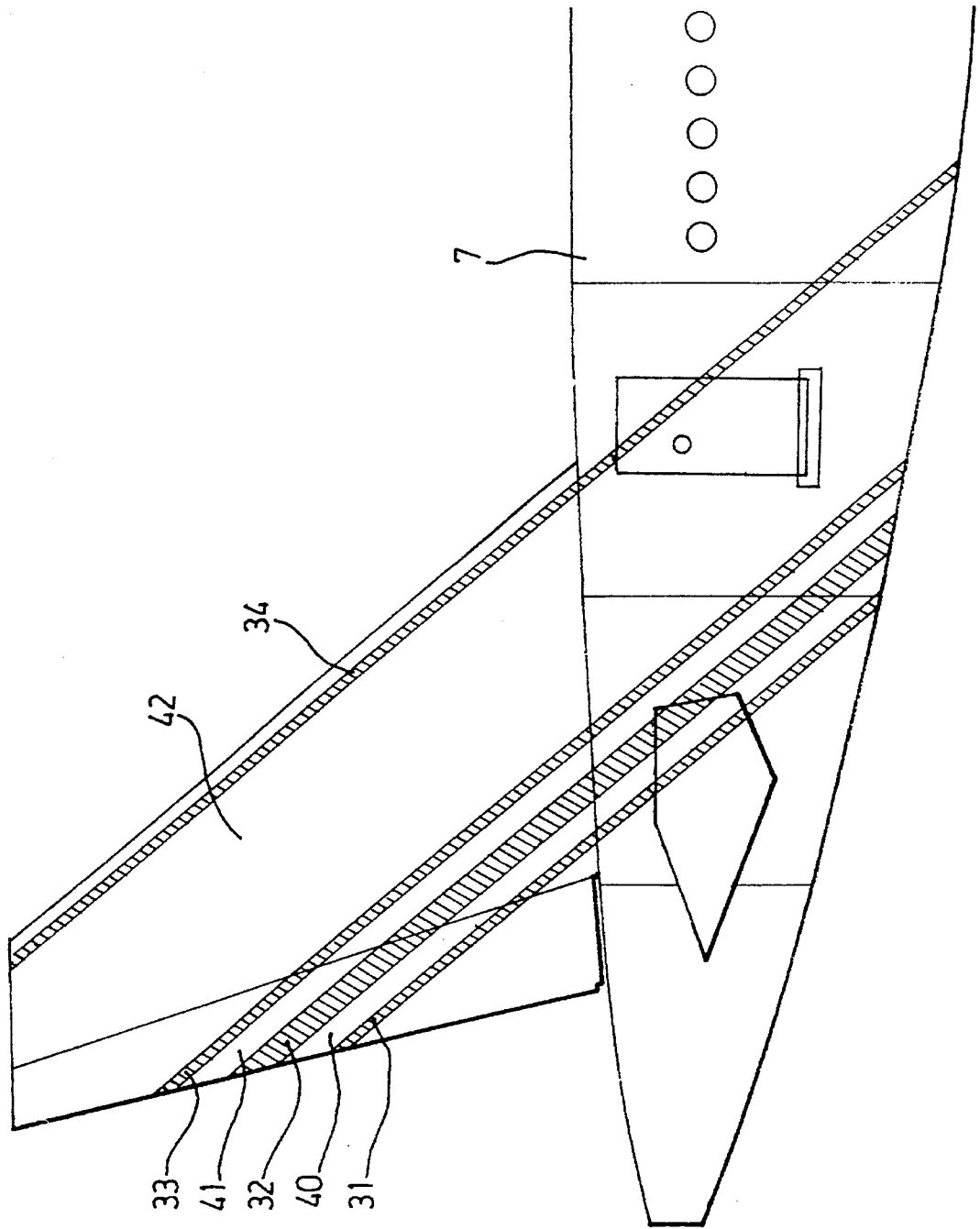

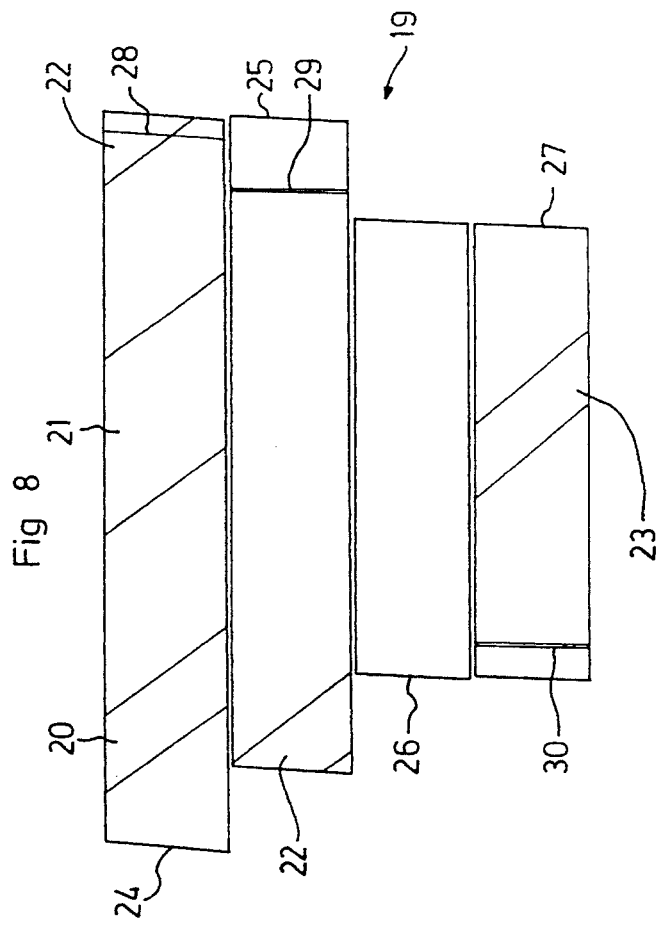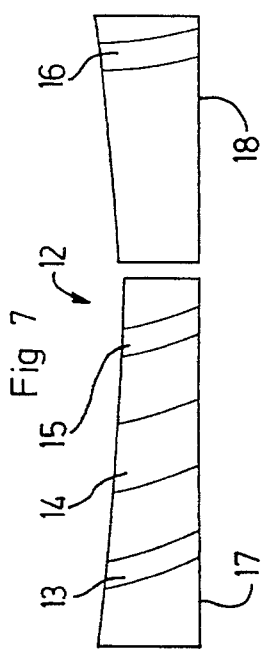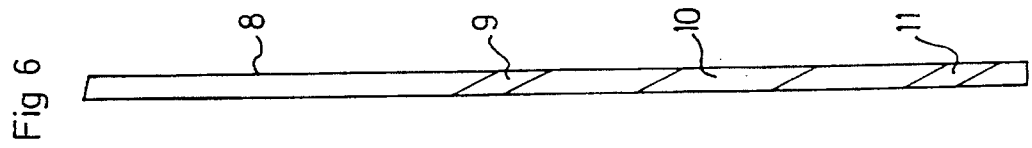

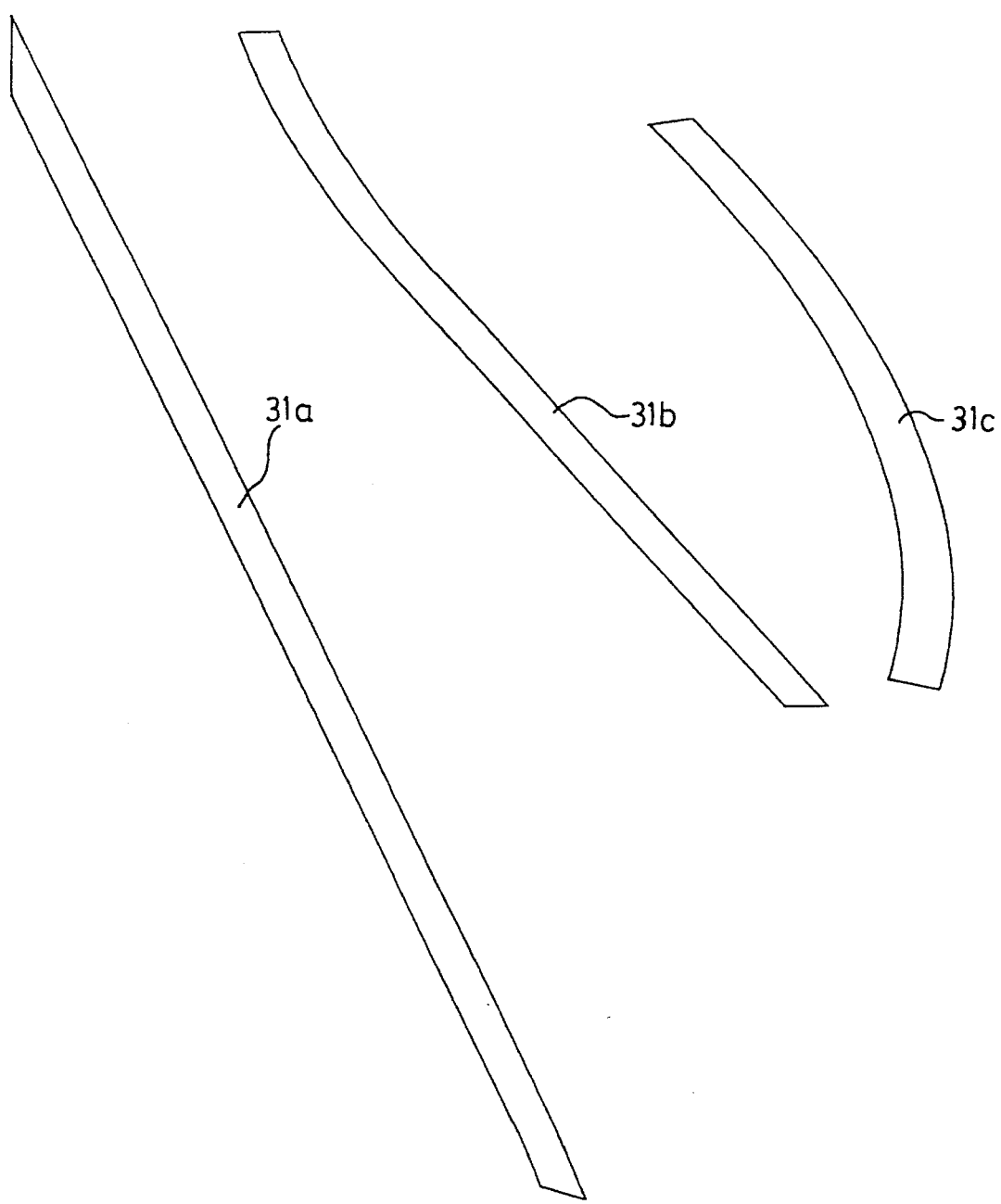

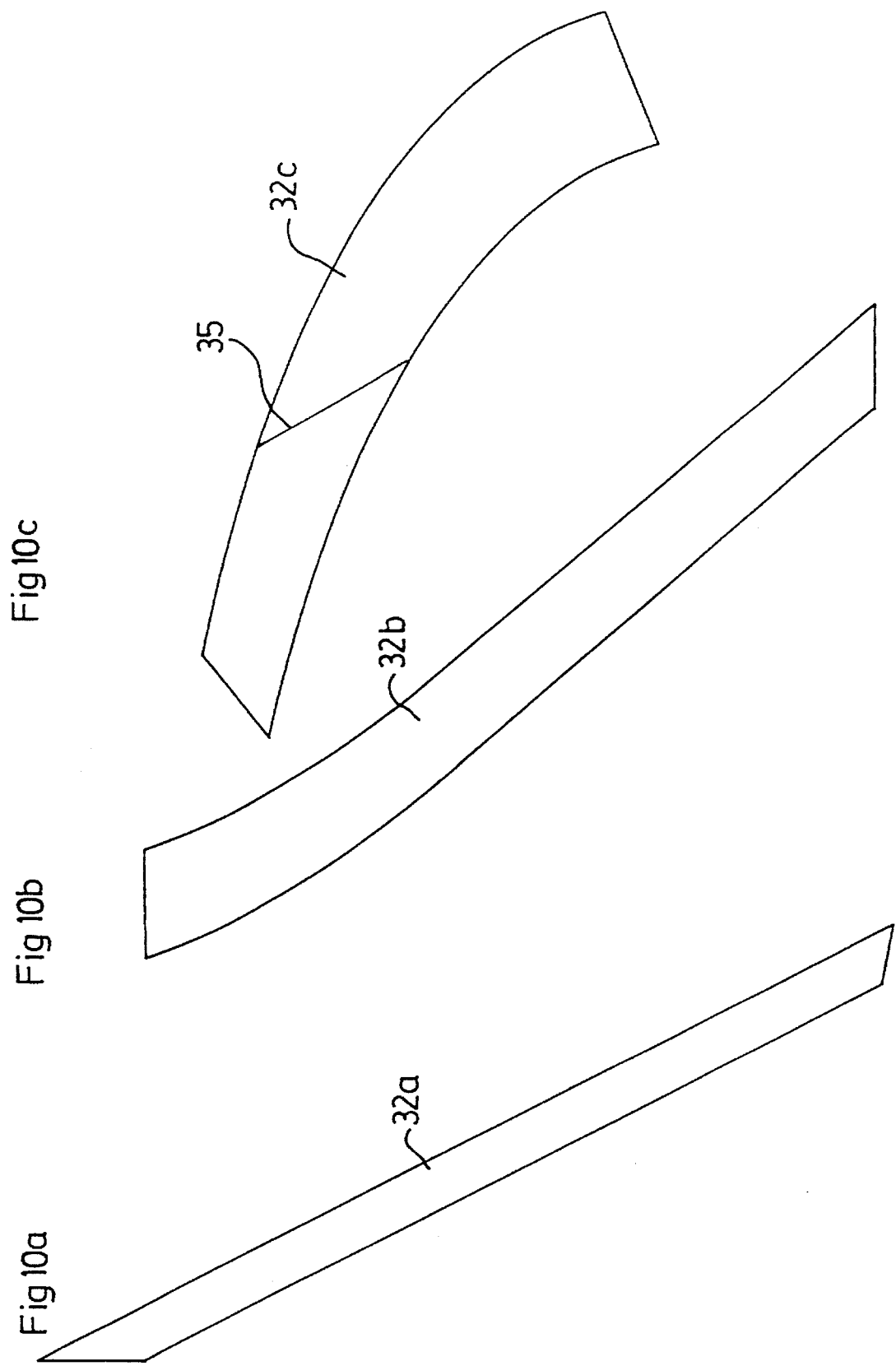

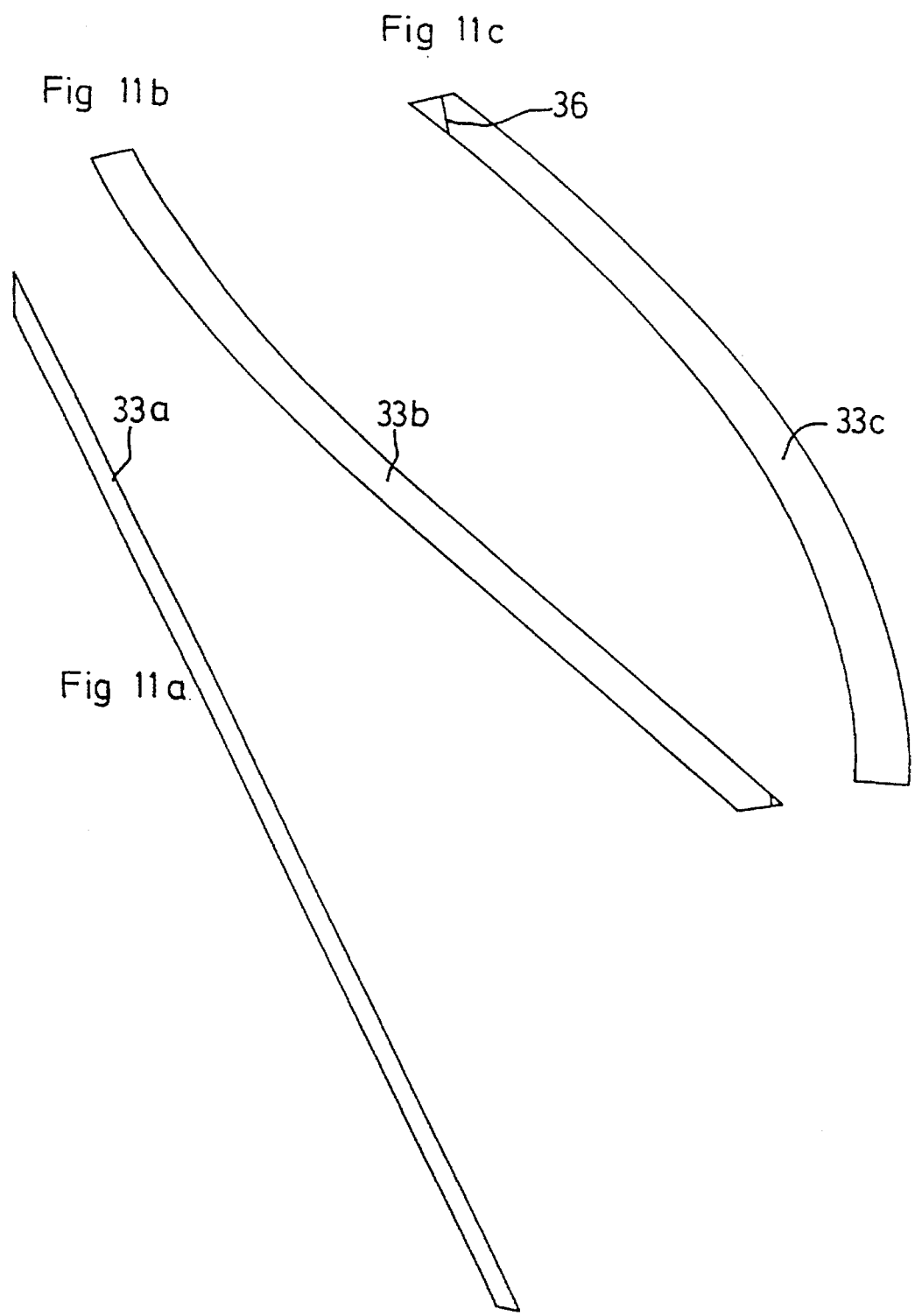

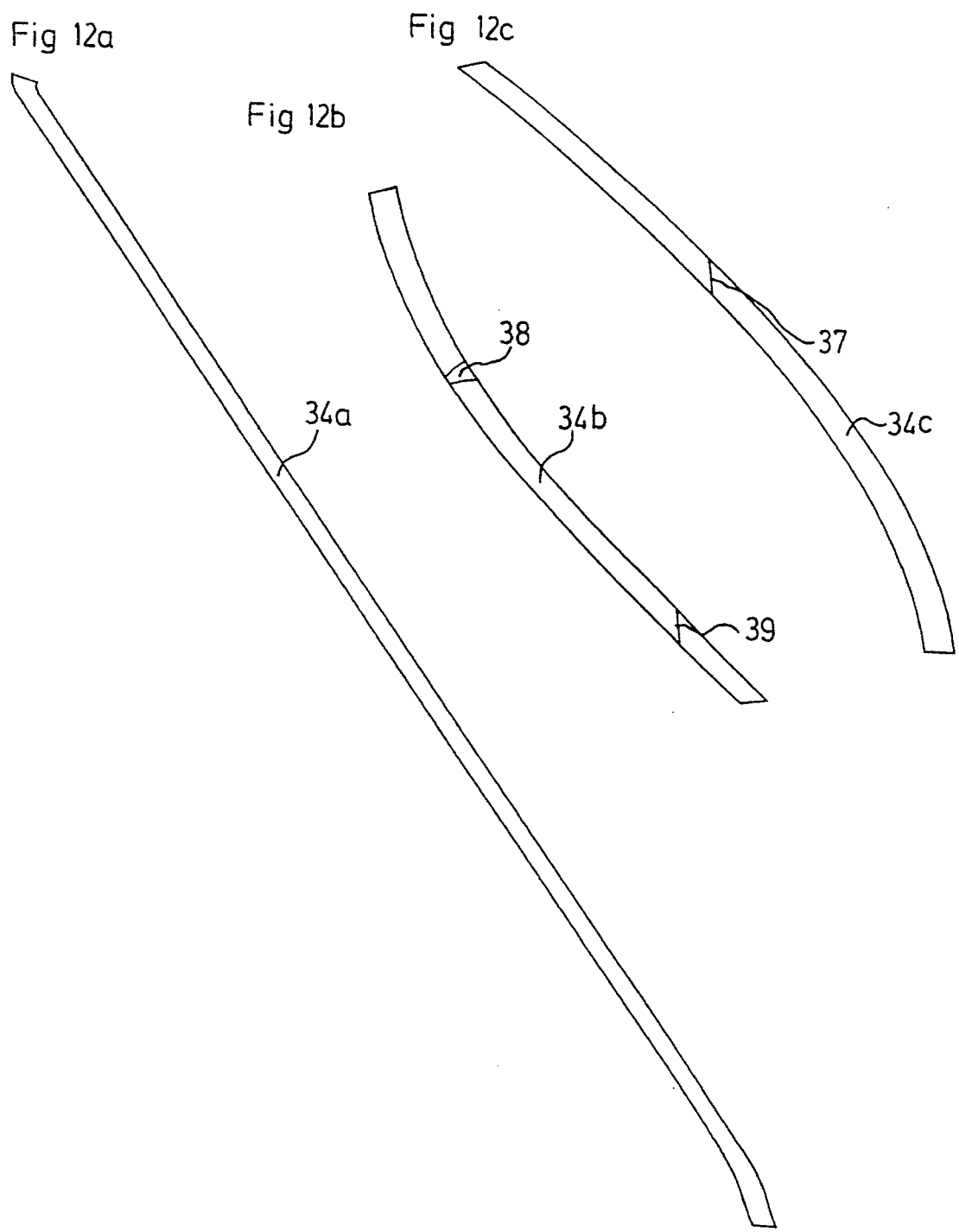

METHOD AND DEVICE FOR MANUFACTURING ADHESIVE ELEMENTS TO BE APPLIED TO A THREE-DIMENSIONAL SURFACE FOR THE PURPOSE OF DECORATING IT

The invention concerns a method and a device for manufacturing adhesive elements to be applied to a three-dimensional surface for the purpose of decorating it. It is applicable in particular to the decoration of aircraft.

The task of carrying out all the decoration work on an aircraft is a highly skilled craft and requires a large number of operations which must be carried out meticulously and require specialised personnel.

Firstly, and as regards the logos, the first step is to produce a life-size translucent support for this logo. This support is then positioned on the aircraft, with all the problems posed by the application of a flat support to a three-dimensional surface with a complex shape (folds in the support requiring cutting, etc). Subsequently, two solutions are used:

According to a first solution, the logo is marked on the aircraft, first of all by perforating the support around its outline, and then by marking the position of these perforations on this aircraft. The support is then pulled off and an adhesive strip joining up the perforations is applied, which defines the outlines of the logo to be painted.

According to a second solution, an adhesive stencil is produced in parallel to the support and is slid underneath this support and applied to the aeroplane.

As indicated above, it is apparent that all these operations are delicate and require, firstly, a great deal of working time and, secondly, skilled labour. Furthermore, the result obtained depends in particular on the know-how of the personnel undertaking the decoration work, and the positioning of the supports, and it is virtually impossible to achieve total repeatability of this decoration from one aeroplane to the next.

Finally, since the decoration work is carried out initially on a flat support, which is then applied to a three-dimensional surface, the result never conforms to the shape initially desired. Consequently, this support frequently has to be modified one or more times before the decoration work is to the complete satisfaction of the company owning the aircraft.

Furthermore, as regards horizontal, vertical, oblique etc strips, the method used is even more highly skilled than for the logos. In fact, this method firstly involves positioning the starting coordinates of these strips, which are marked on the aeroplane. Using these starting coordinates, adhesive strips are applied in order to define the strips to be painted. Nevertheless, given the curved shape of aircraft surfaces, the linearity of these adhesive strips must be checked visually and, in view of the size of these aircraft, it may be imagined how difficult it is to put such strips in exactly the right place.

Finally, and in order to attempt to obtain a visual repeatability between the first aeroplane decorated and subsequent aeroplanes, a translucent support is applied to the aircraft on which are marked the edges of the strips and references.

As with the logos, it will be appreciated that all the operations referred to above are time-consuming and delicate and require skilled labour. Moreover, again as previously, and in spite of the fact that a support model is produced, the result is in large measure dependent on the know-how of the personnel and it is virtually impossible to achieve complete repeatability.

The present invention aims to mitigate all of the drawbacks described above and proposes a method and a device allowing the "initial decoration" of a three-dimensional surface to be undertaken reliably and rationally, and allowing complete repeatability of this decoration.

Another objective is to provide a process making it possible to produce decorations which, on the three-dimensional surface, constitute a perfect image of the decoration displayed in two dimensions.

Another objective is to provide a process making it possible to validate a decoration before it is carried out.

To this end, the invention relates to a process for manufacturing adhesive elements intended to be applied to a three-dimensional surface for the purpose of decorating it, characterised in that:

a) a three-dimensional model is memorised which consists of a mathematical representation of the three-dimensional surface to be decorated, b) the coordinates of reference lines and points of the three-dimensional surface are memorised in complementary fashion so as to obtain a referenced three-dimensional model, c) a two-dimensional model consisting of a mathematical representation of the outlines defining the areas to be decorated, projected in one plane, is memorised, d) transformation computations are carried out on the two-dimensional model with a view to obtaining a referenced two-dimensional model positioned in relation to reference lines and/or points, e) computations on the projection of the referenced two-dimensional model onto the three-dimensional model are carried out, so as to obtain a mathematical representation of the outlines of the areas to be decorated on the three-dimensional surface, associated with the reference lines and points, f) laying-out computations are carried out on the mathematical representation obtained at (e) in such a way as to obtain data representative of the layout of the outlines of the areas to be decorated and of the reference lines and points, g) the adhesive elements are cut out using a numerically-controlled cutting machine driven by the data obtained at (f), h) and on at least some cut-out adhesive elements, the reference points and/or lines are marked, using a numerically-controlled tracing machine driven from the data obtained at (f).

(It should be noted that by the term adhesive is meant any means allowing an element to be applied and maintained on a three-dimensional surface, ie self-adhesive, magnetic, etc).

The method according to the invention consists therefore, starting with a two-dimensional model comprising an "image" of the decoration, of referencing this model for the purpose of positioning the decoration on the referenced three-dimensional model, then carrying out projection computations so as to obtain a three-dimensional representation of the referenced decoration in relation to the three-dimensional surface, and finally carrying out laying-out computations on this three-dimensional representation.

The adhesive elements obtained subsequently by cutting out and on which are marked the reference points and/or lines, may then be applied very easily to the three-dimensional surface without the need for any support whatsoever since they include reference marks allowing them to be positioned in relation to references on the said three-dimensional surface.

The ease of laying is, moreover, obtained by virtue of the perfect fit of the adhesive elements which are designed in three dimensions and laid out before being cut out, which allows the shapes of the three-dimensional surface to be taken into account in advance.

Beyond its rational aspects, this method also enables decorations to be produced which, by virtue of the laying-out computations, constitute the exact image of the decoration as desired. Moreover, it ensures complete repeatability of the decorations and the positioning of the latter on the three-dimensional surface.

According to another characteristic of the invention, for an area of the three-dimensional surface to be decorated (e):

at least one control point is memorised corresponding to a location at which this area to be decorated is to be checked, the said control point being positioned in space in relation to the reference lines and points of the referenced three-dimensional model, the coordinates of a point on the referenced three-dimensional model are memorised, the so-called target point corresponding substantially to the center of the area to be decorated, and the coordinates of a straight line, known as the line of sight, passing through the said target point and the control point, the coordinates in the referenced three-dimensional model, in a plane, referred to as the display plane, at right angles to the line of sight and containing the control point, are memorised, transformation computations are carried out on the referenced two-dimensional model with a view to obtaining a mathematical representation of the outlines of the area to be decorated in the display plane, transformation computations are carried out on the referenced three-dimensional model so as to obtain a representation in a conical perspective along the line of sight, and with the control point of the said three-dimensional model as its starting point, transformation computations are carried out on the referenced two-dimensional model, in the display plane, so as to bring into line the reference points and lines of the said two-dimensional model and of the three-dimensional model in a conical perspective, computations are carried out on the projection of the two-dimensional model onto the three-dimensional model in a conical perspective, at right angles to the display plane, so as to obtain a mathematical representation of the outlines of the area to be decorated on the three-dimensional surface.

Such a projection method, using a representation in conical perspective of the three-dimensional surface, makes it possible to obtain an image of the latter and thus of the projection of the decoration which comes as close as possible to the actual image as it will be seen from the control point or points.

Moreover, this representation in a conical perspective makes it possible, during the design stage, to check and validate the results obtained.

According to another characteristic of the invention, for an area to be decorated on the three-dimensional surface (f):

f1) transformation computations are carried out on the three-dimensional model with a view to obtaining, by approximation, a mathematical representation of a three-dimensional surface which can be laid out, f2) orthogonal projection computations are carried out on the outlines of the area to be decorated and the reference lines and/or points related to this area, so as to obtain a mathematical representation of the said outlines and reference lines and/or points on the three-dimensional surface to be laid out, f3) laying-out computations are carried out on the mathematical representation obtained at f2) so as to obtain data representative of the laying-out of the outlines of the areas to be decorated and of the reference lines and/or points.

Furthermore, according to another characteristic aimed at applying the process according to the invention to the decoration of a three-dimensional surface such as an aircraft, consisting of complex shapes:

(a) a three-dimensional model is memorised, consisting of a series of constituent surfaces, referred to as blocks, connected to one another by boundary lines, f1) all the blocks on the three-dimensional surface containing the outlines of the area of be decorated and the reference points and/or lines related to this area, and forming a subassembly of the said three-dimensional surface, are selected, data representative of the aforesaid subassembly of blocks are memorised, transformation computations are carried out on this subassembly of blocks, with a view to obtaining, by approximation, a mathematical representation of a surface to be laid out.

In addition, according to one advantageous embodiment, the method according to the invention preferably consists of producing two types of adhesive element to fulfil different functions:

adhesive elements, referred to as decorative elements, defined by the areas to be decorated, adhesive elements, referred to as positioning elements, to be applied to the three-dimensional surface corresponding to reference lines and/or points on the latter, with a view to making it possible to position the decorative elements in relation to the said reference lines and/or points.

The invention also extends to a device for the manufacture of adhesive elements to be applied to a three-dimensional surface for the purpose of decorating it, characterised in that it comprises, in combination:

means of memorising referenced three-dimensional models consisting of mathematical representations of three-dimensional surfaces to be decorated and by coordinates of reference lines and points of the said surfaces, means of memorising two-dimensional models consisting of mathematical representations of outlines defining the areas to be decorated, projected in one plane, a computing unit connected to the memorisation means and programmed to carry out, from memorised data representative of a three-dimensional surface to be decorated, and outlines defining an area to be decorated:

transformation computations on the two-dimensional model with a view to obtaining a referenced two-dimensional model positioned in relation to reference lines and/or points, computations for projecting the referenced two-dimensional model onto the three-dimensional model, so as to obtain a mathematical representation of the outlines of the areas to be decorated on the three-dimensional surface, associated with the reference lines and points, and laying-out computations on the aforesaid mathematical representation so as to obtain data representative of the laying-out of the outlines of the areas to be decorated, and of the reference lines and points, display means connected to the computing unit with a view to permitting interactive display during each of the aforesaid computation stages, a numerically-controlled cutting machine intended to be driven by data generated by the computing unit, and a numerically-controlled tracing machine intended to be driven by data generated by the computing unit.

Figure 2:
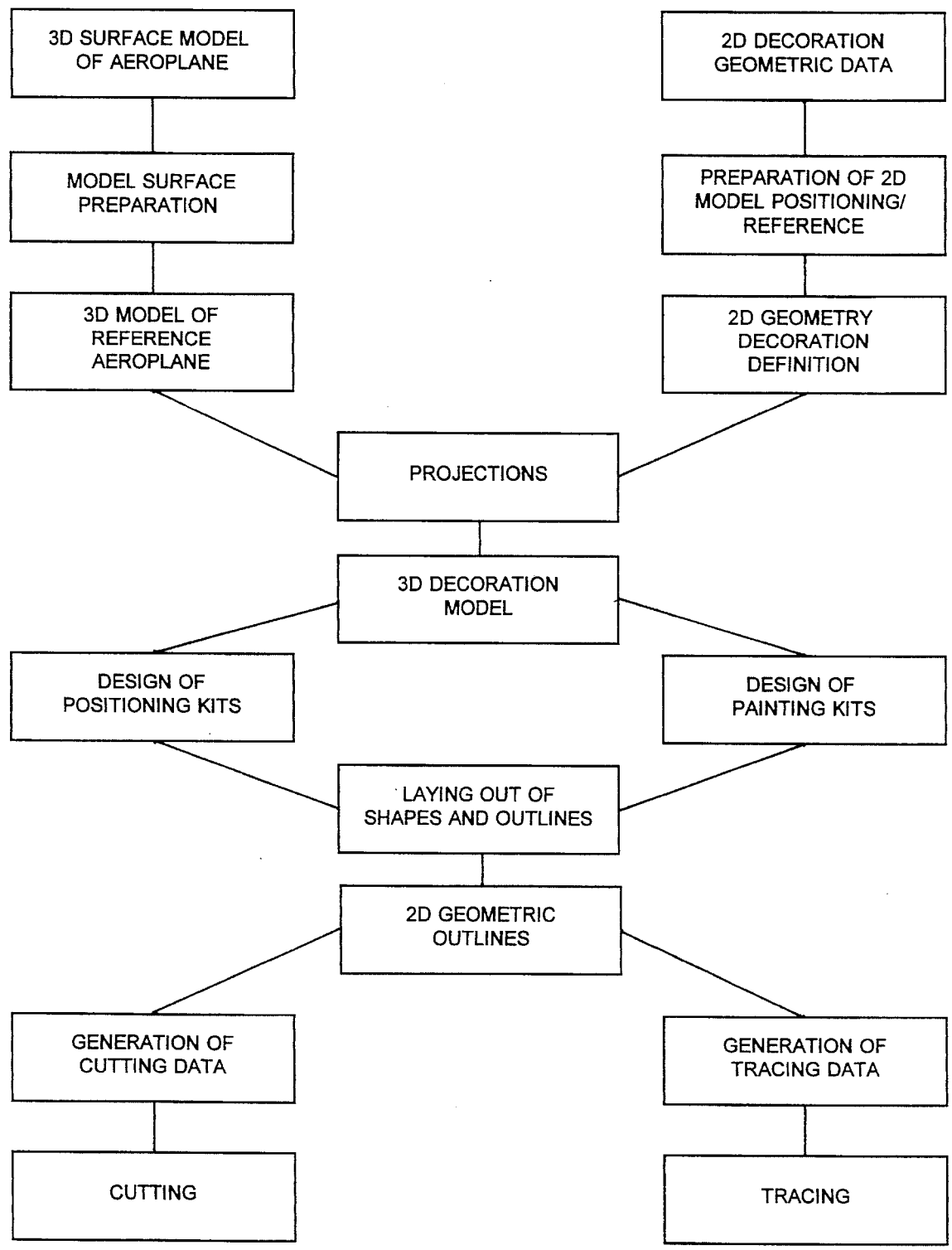
Figure 3:
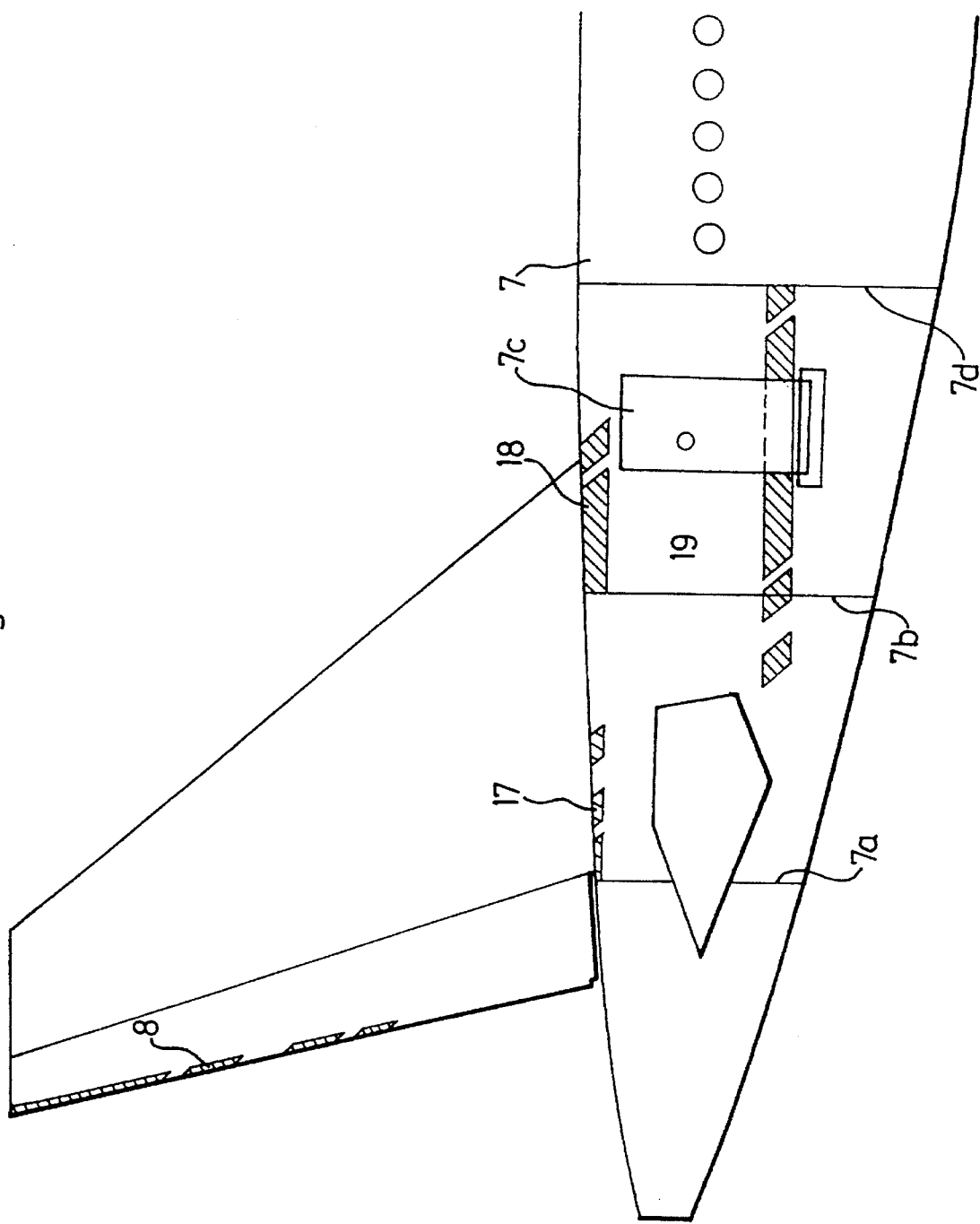

Other characteristics, aims and advantages of the invention will emerge from the following detailed description given with reference to the accompanying drawings which, by way of non-limiting example, represent a preferred embodiment. In these drawings, which form an integral part of the present description:

FIG. 1 is a diagrammatic perspective view of the various elements making up a device according to the invention, FIG. 2 is a flow diagram representing the processing chain of the device according to the invention, FIG. 3 is a side view of the rear of an aircraft on which are disposed adhesive positioning elements for painting oblique strips, FIG. 4 is a side view of the rear of this aircraft on which are disposed the adhesive positioning elements and the adhesive decorative elements for painting oblique strips, FIG. 5 is a side view of this rear of an aircraft after the adhesive positioning elements have been taken off, FIGS. 6, 7 and 8 show the various positioning elements in FIGS. 3 and 4, FIGS. 9a–9c to 12a–12c show the various adhesive decorative elements in FIGS. 4 and 5.

The device shown in FIG. 1 is intended for producing adhesive elements to be applied to a three-dimensional surface for the purpose of decorating it.

This device includes, firstly, a work station 1, having a computing unit programmed to produce, from memorised data, files made up of data representative of the laying-out of the outlines of the areas to be decorated associated with reference lines and points of the three-dimensional surface.

This work station 1 also has a display screen 2 connected to the computing unit with a view to permitting interactive display allowing verification and validation of the results obtained.

The device according to the invention includes, moreover, a numerically-controlled cutting machine 3 driven by a microcomputer 4 programmed so as to generate cutting commands executed on the files of the outlines of the areas to be decorated.

This device also includes a numerically-controlled tracing machine 5 which is also driven by a microcomputer 6 programmed so as to generate tracing orders executed on the files of the outlines of the areas to be decorated.

The processing chain allowing adhesive elements to be produced by means of the device according to the invention is shown in FIG. 2.

The basic data used consist of a three-dimensional model consisting of a mathematical representation of the outer skin of the aircraft to be decorated. This three-dimensional model is memorised in the form of a set of constituent surfaces, referred to as blocks, connected to one another by boundary lines.

In the initial stage, the three-dimensional model is referenced, ie this model is enhanced using physical references obtained either by measurement of dimensions directly on the aeroplane, or by consulting the set of drawings relating to this aeroplane.

The following may be cited as examples of physical references used: the frame references, the skin panel boundaries, the fixing lines, the doors, the cabin windows, the hatches, etc.

In parallel, the outlines defining the areas to be decorated (logos, longitudinal strips, etc) are modelled, for example by digitising, with a view to obtaining two-dimensional models consisting of geometric data representative of the outlines of the areas to be decorated seen in plan view.

This two-dimensional model is then enhanced with references with a view to positioning the areas to be decorated in relation to the projections in one plane of the physical references of the aeroplane. Referenced two-dimensional models are thus obtained for the various decorations to be produced on the aeroplane.

From these memorised data and for each area of an aircraft to be decorated, initially computations are carried out on the projection of the referenced two-dimensional model onto the three-dimensional model, so as to obtain a mathematical representation of the outlines of this area to be decorated on the three-dimensional surface, associated with the reference lines and points.

These projection computations are carried using as control points:

for the areas to be decorated on the length of the aircraft with a constant cross section, a succession of control points situated along a control line parallel to the said length and of the same length as the latter, for the areas to be decorated on the front tapered end and rear tapered end of the aircraft, two control points corresponding respectively to each of the ends of the aforesaid control line.

These projection computations make it possible to obtain a three-dimensional model of the decoration which may be viewed in a conical perspective on the display screen 2 before being validated.

The following stage consists of designing on the referenced three-dimensional model and according to the order of the painting operations, all the adhesive elements, collectively referred to as kits, relating to each of these operations.

These kits consist firstly of decorating kits or painting kits for defining the areas to be painted, and secondly positioning kits making it possible to position the painting kits in relation to the physical references of the aircraft.

Once this design has been produced, laying-out computations are carried out so as to obtain data representative of the laying-out of the outlines of the kits previously defined.

Finally, programs for generating, firstly the commands for cutting the kits, and secondly the commands for tracing on these kits reference lines and/or points, are executed on the files made up of data representative of the outlines of these kits.

As an illustrative example, FIGS. 6 to 12C show positioning and painting kits intended to be applied to the rear part of an aircraft 7, in the way shown in FIGS. 3 to 5, with a view to painting oblique longitudinal strips on this aircraft. All these kits are designed so that these strips of paint appear straight from a control point situated at the rear end of the control line described above.

All these kits are of the three-layer type and comprise an adhesive sheet stuck onto a protective sheet and an adhesive application film disposed on the adhesive sheet.

In addition, the adhesive sheets of the positioning kits are precut so as to allow, once these kits are positioned on the aircraft 7, parts of the said adhesive sheets to be pulled off.

As shown in FIGS. 6, 7, 8, the positioning kits are three in number, and each has detachable strips determining, once pulled off, widths conjugate with those of the painting kits.

The first positioning kit shown in FIG. 6 is a rudder kit 8 intended to be applied along the trailing edge of this rudder, from the upper end of the latter. It has three superimposed detachable strips 9, 10, 11.

The second positioning kit shown in FIG. 7 is a positioning kit 12 intended to be applied at the fillet/rudder join. This kit has four detachable strips 13, 14, 15, 16. It consists, in addition, of two separate lengths 17, 18, each referenced at their end edge on one of the frames 7a, 7b of the aircraft 7.

The third positioning kit 19, shown in FIG. 8, is a positioning kit intended to be applied to the fuselage. With a view to its positioning with respect to height, this kit 19 is referenced, at its upper edge, on the fuselage reference of the aircraft 7 which is marked systematically on all aircraft. This kit also has four detachable strips 20, 21, 22, 23. It consists, in addition, of four lengths 24, 25, 26, 27 intended to be disposed end to end and having, for the purpose of their longitudinal positioning, a reference 28 in relation to the frame 7b of the aircraft 7, and a reference 29, 30 in relation to each side of the rear door 7c of the said aircraft.

These positioning kits are shown in FIG. 3, once they have been applied to the aircraft 7 and after the detachable strips 9–11, 13–16, 20–23 have been pulled off.

The painting kits for their part consist of four assemblies 31, 32, 33, 34 each formed from three lengths of strips 31a–31c, 32a–32c, 33a–33c, 34a–34c intended to be disposed end to end.

Each of these assemblies 31–34 has a length of rudder unit strip 31a, 32a, 33a, 34a intended to be applied to the rudder and to extend between the rudder positioning 8 kits and fillet/rudder join 12 kits.

The second strip length 31b, 32b, 33b, 33b, 34b of each of these assemblies 31–34 is intended to be applied to the fuselage in a continuation of the first length and to extend as far as the fuselage reference of the aircraft 7.

Finally, the third strip length 31c, 32c, 33c, 34c of each of the assemblies 31–34 is intended to be applied to the fuselage in continuation of the second length and to extend as far as the axis of the aircraft 7.

It should be noted, in addition, that the strip lengths 32c, 33c, 34c of the assemblies 32, 33, 34 have references, respectively 35, 36, 37, in relation to the frame 7b and another frame 7d of the aircraft 7. Moreover, the length 34b of the assembly 34 has a reference 38, 39 in relation to each of the sides of the door.

These painting kits 31–34 are shown in FIG. 4, once they have been applied to the aircraft 7 and before the positioning kits 8, 12, 19 have been pulled off. Lastly, FIG. 5 shows these painting kits 31–34 once the positioning kits 8, 12, 19 have been pulled off.

As shown in these figures, these kits define, on the aircraft, two narrow strips 40, 41 and a wider strip 42. Once these surface strips have been painted, it suffices to pull off the painting kits and to apply adhesive strips to each side of the areas initially covered by the assemblies 32, 33 with a view to painting the said areas.

We claim:

1. Process for manufacturing adhesive elements (8, 12, 19, 31–34) to be applied to a three-dimensional surface (7) for use in decorating it, the elements comprising two-dimensional elements to be adhered to areas of said three-dimensional surface, comprising a) memorizing a three-dimensional model which consists of a mathematical representation of a three-dimensional surface (7) to be decorated, b) memorizing the coordinates of reference lines and/or points (7a, 7b, 7c, 7d) of the three-dimensional surface (7) so as to obtain a referenced three-dimensional model, c) memorizing a two-dimensional model consisting of a mathematical representation of outlines defining the areas to be decorated, projected in one plane, d) carrying out transformation computations on the two-dimensional model to obtain a referenced two-dimensional model positioned in relation to reference lines and/or points, e) carrying out computations on a projection of the referenced two-dimensional model onto the referenced three-dimensional model so as to obtain a mathematical representation of the outlines of the areas to be decorated on the three-dimensional surface, associated with the reference lines and/or points, f) carrying out laying-out computations on the mathematical representation obtained in step (e) to obtain data representative of the layout of the outlines of the areas to be decorated and of the reference lines and/or points, g) cutting out adhesive elements (8, 12, 19, 31–34) using a numerically-controlled cutting machine (3) driven by the data obtained in step (f), h) and marking on at least some of said cut-out adhesive elements (8, 12, 19, 31–34), the reference points and/or lines, using a numerically-controlled tracing machine (5) driven from the data obtained in step (f).

2. Method according to claim 1, comprising, for an area of the three-dimensional surface to be decorated (e):

memorizing at least one control point corresponding to a location at which this area to be decorated is to be checked, said at least one control point being positioned in space in relation to the reference lines and/or points of the referenced three-dimensional model, memorizing the coordinates of a target point on the referenced three-dimensional model, the target point corresponding substantially to the centre of the area to be decorated, and the coordinates of a straight line, known as the line of sight, passing through said target point and the at least one control point, memorizing the coordinates in the referenced three-dimensional model, in a plane, referred to as the display plane, at right angles to the line of sight and containing the control point, carrying out transformation computations on the referenced two-dimensional model to obtain a mathematical representation of the outlines of the area to be decorated in the display plane, carrying out transformation computations on the referenced three-dimensional model so as to obtain a representation in a conical perspective along the line of sight, and with the control point of said three-dimensional model as its starting point, carrying out transformation computations on the referenced two-dimensional model, in the display plane, so as to bring into line the reference lines and/or points of said two-dimensional model and of the three-dimensional model in a conical perspective, carrying out computations on the projection of the two-dimensional model onto the three-dimensional model in a conical perspective, at right angles to the display plane, so as to obtain a mathematical representation of the outlines of the area to be decorated on the three-dimensional surface.

3. Method according to claim 2, applied to the decoration of an aircraft (7) with a front tapered end, a length with a constant cross section and rear tapered end, comprising:

for the areas to be decorated on the length with a constant cross section, memorizing a succession of control points situated along a control line parallel to the said length and of the same length as the constant cross section length for the areas to be decorated of the front and rear tapered ends, memorizing two control points corresponding respectively to each of the ends of the aforesaid control line.

4. Method according to claim 1, comprising, for an area to be decorated on the three-dimensional surface:

carrying out transformation computations on the three-dimensional model to obtain, by approximation, a mathematical representation of a three-dimensional surface which can be laid out, carrying out orthogonal projection computations on the outlines of the area to be decorated and the reference lines and/or points related to this area, so as to obtain a mathematical representation of said outlines and reference lines and/or points on the three-dimensional surface to be laid out, carrying out laying-out computations on the mathematical representation obtained in the immediately preceding step so as to obtain data representative of the laying-out of the outlines of the areas to be decorated and of the reference lines and/or points.

5. Method according to claim 4 applied to the decoration of a three-dimensional surface, consisting of complex shapes, comprising:

memorizing a three-dimensional model, consisting of a series of constituent surfaces, referred to as blocks, connected to one another by boundary lines, selecting all the blocks on the three-dimensional surface containing the outlines of the area to be decorated and the reference points and/or lines related to this area, and forming a subassembly of said three-dimensional surface, memorizing data representative of the aforesaid subassembly of blocks, carrying out transformation computations on this subassembly of blocks, to obtain, by approximation, a mathematical representation of a surface to be laid out.

6. Method according to claim 1, comprising producing two types of adhesive elements to fulfill different functions:

adhesive elements (31–34), referred to as decorative elements, defined by the areas (40–42) to be decorated, adhesive elements (8, 12, 19), referred to as positioning elements, to be applied to the three-dimensional surface (7) corresponding to reference lines and/or points (7a–7d) of the areas, to make it possible to position the decorative elements in relation to said reference lines and/or points.

* * * * *